United States Patent
Schmidl et al.

(10) Patent No.: US 7,567,624 B1
(45) Date of Patent: Jul. 28, 2009

(54) SYSTEM AND METHOD OF COMMUNICATING USING COMBINED SIGNAL PARAMETER DIVERSITY

(75) Inventors: Timothy M. Schmidl, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/526,930

(22) Filed: Mar. 16, 2000

Related U.S. Application Data

(60) Provisional application No. 60/146,619, filed on Jul. 30, 1999, provisional application No. 60/146,477, filed on Jul. 30, 1999.

(51) Int. Cl.
*H04L 27/00* (2006.01)
(52) U.S. Cl. .................................. 375/299
(58) Field of Classification Search ............. 375/260, 375/267, 299, 347; 455/101, 103
See application file for complete search history.

(56) References Cited

U.S. PATENT DOCUMENTS

| | | | | |
|---|---|---|---|---|
| 5,648,968 | A * | 7/1997 | Reudink | 370/335 |
| 5,999,826 | A * | 12/1999 | Whinnett | 455/561 |
| 6,154,661 | A * | 11/2000 | Goldburg | 455/562.1 |
| 6,185,440 | B1 * | 2/2001 | Barratt et al. | 455/562.1 |
| 6,377,632 | B1 * | 4/2002 | Paulraj et al. | 375/299 |
| 6,400,780 | B1 * | 6/2002 | Rashid-Farrokhi et al. | 375/347 |
| 6,636,495 | B1 * | 10/2003 | Tangemann | 370/334 |

OTHER PUBLICATIONS

J.H. Winters, "The diversity gain of transmit diveristy in wireless systems with Rayleigh fading," IEEE 1998, vol. 47, pp. 119-123.*

* cited by examiner

*Primary Examiner*—Kevin Y Kim
(74) *Attorney, Agent, or Firm*—Ronald O. Neerings; Wade James Brady, III; Frederick J. Telecky, Jr.

(57) ABSTRACT

A system and method of data communication uses variable transmit antenna delays based on communication signal uplink measurements. The signals for each channel are delayed at baseband, so different delays can be used for each channel. The delay between each antenna are preferably chosen so that the strongest paths do not overlap in order to implement full transmit antenna diversity. Where it is not possible to eliminate overlapping paths, the transmitted signals are recharacterized by phase shifts and/or amplitude scaling to derive signals that inherently possess the desired communication signal characteristics.

40 Claims, 3 Drawing Sheets

SYSTEM AND METHOD OF COMMUNICATING USING COMBINED SIGNAL PARAMETER DIVERSITY

RELATED PATENT APPLICATIONS

This application claims priority under 35 U.S.C. § 119(e)(1) of provisional application Ser. No. 60/146,619, filed Jul. 30, 1999, by Timothy M. Schmidl and Anand G. Dabak and further claims priority under 35 U.S.C. §119(e)(1) of provisional application Ser. No. 60/146,477, filed Jul. 30, 1999, by Timothy M. Schmidl and Anand G. Dabak.

This application is related to U.S. patent application entitled System And Method Of Communication Using Transmit Antenna Diversity Based Upon Uplink Measurements For The TDD Mode Of WCDMA, Ser. No. 09/523,329, filed on Mar. 10, 2000, by Timothy M. Schmidl and Anand G. Dabak.

BACKGROUND OF THE INVENTION

1. Field of the Invention

This invention relates generally to communication systems and more particularly to a diversity system and method of data communication using signal delay diversity combined with communication signal phase and/or amplitude diversity associated with TDMA and CDMA communication signals among others.

2. Description of the Prior Art

Delay diversity is a method of transmit antenna diversity in which the same signal is transmitted from multiple antennas, with each antenna having a different time delay. Delay diversity was introduced for TDMA systems such as IS-54 and GSM (global system for mobile communications) by N. Seshadri and J. Winters, Two Signaling Schemes for Improving the Error Performance of Frequency-Division-Duplex (FDD) Transmission Systems Using Transmitter Diversity, Vehicular Technology Conference, pp. 508-511 (1993) and A. Wittneben, A New Bandwidth Efficient Transmit Antenna Modulation Diversity Scheme for Linear Digital Modulation, International Communications Conference, vol. 3, pp. 1630-1634 (1993), wherein the delays for each antenna are chosen to be a multiple of the symbol interval. Present TDMA systems are characterized by transmission of different data signals over a common channel by assigning each signal a unique time period. These data signals are typically transmitted as binary phase shift keyed (BPSK), Gaussian minimum shift keyed (GMSK), or quadrature phase shift keyed (QPSK) data symbols during such unique time periods. These unique periods are allocated to a selected receiver to determine the proper recipient of a data signal. Allocation of such unique periods establishes a communication channel between a transmitter and selected remote receivers for narrow band transmission. This communication channel may be utilized for cable networks, modem transmission via phone lines or for wireless applications.

A selected TDMA receiver must determine both carrier phase and symbol timing of its unique period from the received signal for data recovery. The carrier phase is necessary for generating a reference carrier with the same phase as the received signal. This reference carrier is used to coherently demodulate the received signal, thereby creating a baseband signal. Symbol timing synchronization of the receiver with the transmitter is necessary for the receiver to extract correct data symbols from the baseband signal.

Delay diversity for a synchronous CDMA system (IS-95) was disclosed in U.S. Pat. No. 5,781,541, entitled CDMA System Having Time-Distributed Transmission Paths for Multipath Reception, by A. Schneider, issued Jul. 14, 1998 wherein the delays for each antenna are greater than a chip interval and less than the base station sequence offset between base stations. The Seshadri et al., Wittneben and Schneider references are incorporated by reference herein. Delay diversity for another CDMA communication system and using a distributed antenna system to provide multipath signals in order to facilitate signal diversity for enhanced system performance was disclosed by Gilhousen, et al. in U.S. Pat. No. 5,280,472, entitled CDMA Microcellular Telephone System and Distributed Antenna System Therefor, issued Jan. 18, 1994. A communication system having the advantages of delay diversity in combination with phase and/or amplitude diversity is however, presently unknown. In view of the above, a wireless communication system having selectively variable transmit antenna delays or signal delays combined with selectively variable transmitted signal amplitudes and/or phase characteristics to accommodate TDMA and CDMA modes of communication among others, is both advantageous and desirable to further optimize signal reception.

SUMMARY OF THE INVENTION

The present invention is directed to a system and method of communication using selectively variable transmit antenna delays or signal delays combined with selectively adjustable signal phase and/or or amplitude characteristics, associated with multiple antennas to accommodate different communication modes such as TDMA and CDMA, among others. The signals for each channel are delayed and otherwise adjusted at baseband, so different delays and signal characteristics can be used for each channel. The delay between the antennas can be chosen so that the strongest paths do not overlap such that full diversity can be achieved. For broadcast channels transmitted to all mobile terminals, there is less flexibility in choosing the delays between antennas since the same delay is used for all users. In this case, the antenna delays can be chosen so as to benefit the maximum number of users or the users at the edge of the cell. Where full diversity cannot be achieved due to overlapping signal paths, the respective signal amplitude and phase characteristics can further be adjusted at the base station such that any overlapping signals are constructively combined to produce enhanced and more reliable signal reception at a mobile terminal.

Thus, a method of communicating data between a transmitter having a plurality of antennas and at least one remote receiver according to one embodiment of the present invention comprises the steps of:

selectively shifting the phase and/or amplitude of a data signal produced at a transmitter, to generate derived versions of the data signal;

transmitting from the transmitter, the derived versions of the data signal to each antenna within the plurality of antennas; and providing a distinct delay associated with each derived version of the data signal and its respective antenna.

A communication system according to one embodiment of the present invention comprises:

a transmitter having a plurality of spaced apart antennas;

signal shifting means for selectively shifting the phase and/or amplitude of a communication signal produced at the transmitter to generate derived versions of the communication signal;

signal distribution means for coupling communication signals between the transmitter and the plurality of spaced apart antennas; and delay means operatively coupled to the antennas and the signal distribution means for providing a distinct delay in each of the derived communication signals coupled between the transmitter and the plurality of spaced apart antennas.

A data communication system according to another embodiment of the present invention comprises:

a transmitter having a plurality of spaced apart antennas;

at least one remote receiver in communication with the transmitter;

means for selectively shifting the phase and/or amplitude of a communication signal produced at the transmitter to generate derived versions of the communication signal; and means for providing a distinct delay associated with each antenna such that derived versions of the communication signals coupled between the transmitter and the plurality of spaced apart antennas can be demodulated within the at least one remote receiver.

A data communication system according to yet another embodiment of the present invention comprises:

a transmitter having a plurality of spaced apart antennas;

means for selectively shifting the phase and/or amplitude of a communication signal produced at the transmitter to generate derived versions of the communication signal;

means for transmitting from the transmitter, derived versions of a communication signal to each antenna within the plurality of spaced apart antennas; and means for providing a distinct delay associated with each derived version of the communication signal and its respective antenna within the plurality of spaced apart antennas.

A data communication system according to still another embodiment of the present invention comprises:

a transmitter configured to communicate with at least one remote receiver, the transmitter having a plurality of spaced apart antennas and further having:

a data processor;

a data input device in communication with the data processor;

an algorithmic software directing the data processor; and a data storage unit, wherein discrete signal data is stored and supplied to the data processor such that the data processor, directed by the algorithmic software, can automatically derive communication signal phase parameters and/or communication signal amplitude parameters and communication signal delay parameters using algorithmically defined relationships associated with the discrete signal data such that derived signals communicated between the transmitter and each respective antenna will be characterized by distinct communication signal phase parameters and/or distinct communication signal amplitude parameters and distinct communication signal delay parameters.

A data communication system according to yet another embodiment of the present invention in which system users communicate information signals through a transmitter using TDMA or CDMA communication signals, comprises a transmitter having an antenna system comprising:

a plurality of spaced apart antennas;

means for distributing communication signals between a transmitter and the plurality of spaced apart antennas;

means for selectively phase shifting and/or amplitude scaling communication signals to generate derived communication signals at a transmitter; and variable delay means operatively coupled to the plurality of spaced apart antennas and the signal distribution means for providing selectively adjustable delays associated with the derived communication signals and the plurality of spaced apart antennas.

As used herein, the following words have the following meanings. The words "algorithmic software" means an algorithmic program used to direct the processing of data by a computer or data processing device. The words "data processing device" as used herein refer to a CPU, DSP, microprocessor, micro-controller, or other like device and an interface system. The interface system provides access to the data processing device such that data could be entered and processed by the data processing device. The words "discrete data" as used herein are interchangeable with "digitized data" and "digitized data" as used herein means data which are stored in the form of singularly isolated, discontinuous data or digits.

In one aspect of the invention, a multiple transmit antenna transmitter utilizes delay diversity in combination with phase diversity and/or amplitude diversity to deliver either TDMA or CDMA signals, among others, to a remote receiver.

In another aspect of the invention, a multiple transmit antenna transmitter utilizes adaptive variable delay diversity in combination with either phase diversity or amplitude diversity or both to deliver either TDMA or CDMA mode signals, among others, to a remote receiver.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation.

Numerous other modifications and embodiments can be devised by those skilled in the art which fall within the scope and spirit of the principles of this invention.

DETAILED DESCRIPTION OF THE PREFERRED EMBODIMENTS

Figure 1:
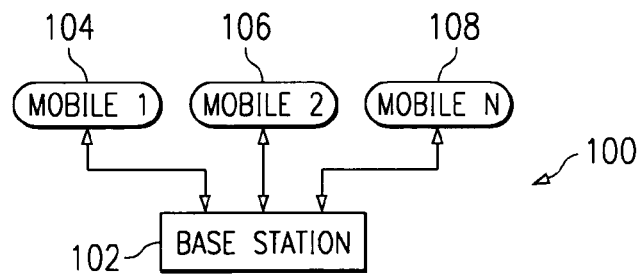
FIG. 1 is a block diagram of a typical cell showing a single base station in communication with a plurality of mobile terminals.

FIG. 1 is a block diagram of a typical cell 100 showing a single base station 102 in communication with a plurality of mobile terminals 104, 106, 108. These devices communicate within the cell 100 using a predetermined mode of data communication such as, for example, time division multiple access (TDMA) or code division multiple access (CDMA). Delay diversity within the cell 100 is accomplished by transmitting derived versions of the same signal from different antennas with at least one distinct delay between any two antennas. The derived versions of the signal are obtained by scaling the amplitude and/or phase shifting the communication signal to be transmitted. This amplitude scaling is most preferably implemented at the base station 102, whereas the communication signal phase shifting can be optionally implemented at either the base station 102 or at the transmit antennas associated with the base station 102. The simplest form of delay diversity would involve simply transmitting the same signal from different antennas with at least one distinct delay between any two antennas. The desired delay is most preferably implemented at the base station, but can be implemented at the antenna system associated with the base station 102 as well.

Figure 2:
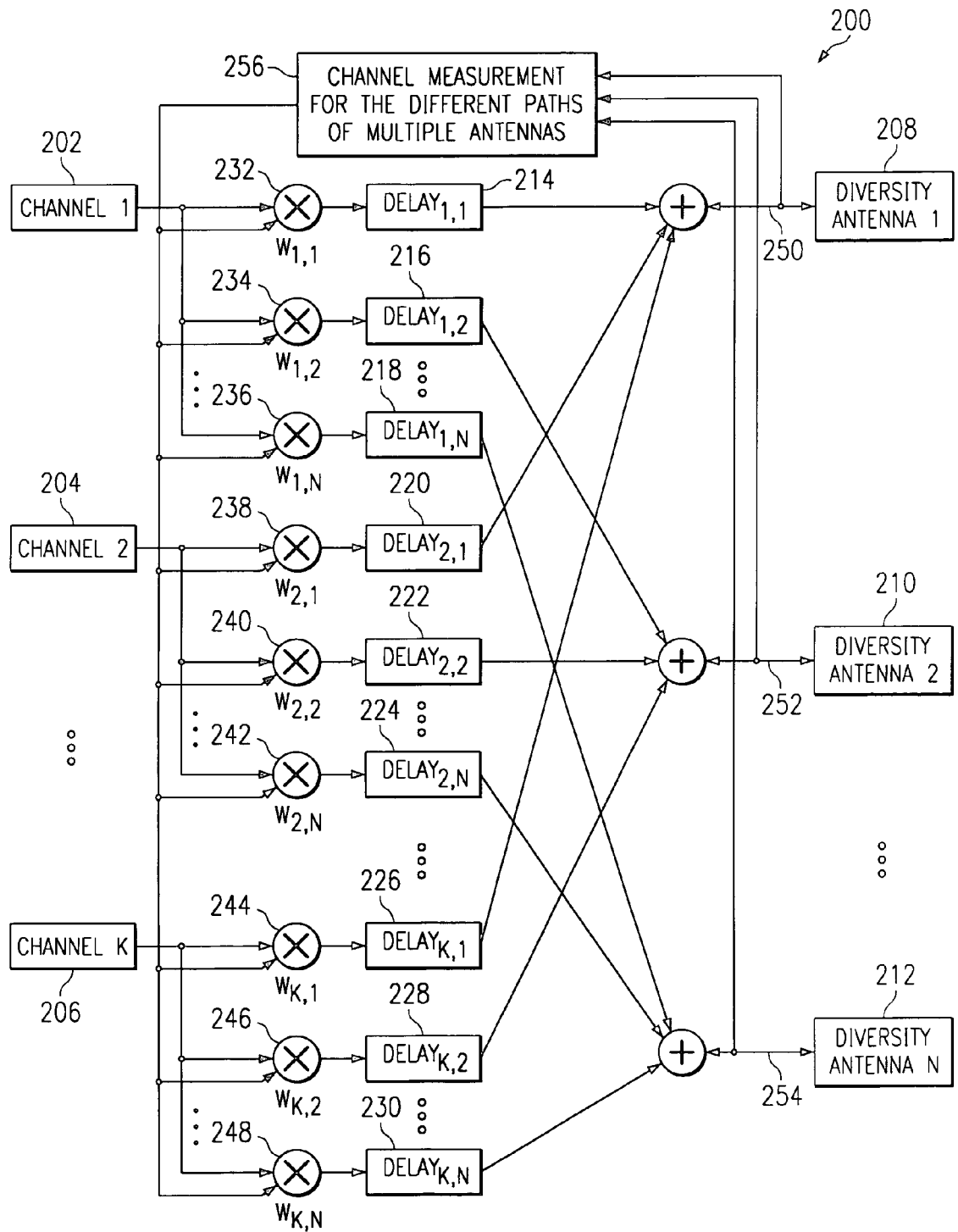
FIG. 2 is a block diagram illustrating one system and method of implementing delay diversity at the base station shown in FIG. 1 and having K channels and N antennas suitable for accommodating TDMA or CDMA mode data/voice communication, among others, according to one embodiment of the present invention.

FIG. 2 is a block diagram 200 illustrating one implementation of combined signal parameter diversity at the base station 102 shown in FIG. 1 and having K channels 202-206 and N antennas 208-212 suitable for accommodating the desired mode of data communication according to one embodiment of the present invention. Transmit antenna delay diversity is generally implemented with fixed delays for each antenna 208-212 (usually a 1-chip delay per antenna for CDMA systems and a 1-symbol delay per antenna for TDMA systems). Delay diversity, as stated above, is a method of transmit antenna diversity in which the same signal is transmitted from multiple antennas, with each antenna having a different time delay for the same signal. With continued reference to FIG. 2, the signals associated with each channel 202-206 may be delayed at baseband, so different delays 214-230 can be used for each channel 202-204.

As stated above, delay diversity within the cell 100 is accomplished by transmitting different derived versions of the same signal from different antennas 208-212 with at least one distinct delay 214-230 between any two antennas. The derived versions of the signal are obtained by scaling the amplitude and/or phase shifting via multiplier/phase shifting elements 232-248 in a manner familiar to those skilled in the art of signal processing. The present inventors realized that simply using variable delay parameters alone to accomplish transmit diversity may not be enough to accommodate reliable signal reception at a mobile terminal under certain unique situations such as discussed in further detail herein below. When these unique situations occur, it is also advantageous to either phase shift the signals to be transmitted and/or scale the signal amplitude of the signals to be transmitted. These unique situations can be determined by taking channel measurements 256 for the different signal paths 252-254 associated with the multiple antennas 208-212. These channel measurements 256 will provide an indication of the signal phase and signal amplitude associated with a particular signal to be transmitted over each signal path 252-254. Thus, by feeding back the requisite channel measurement data, e.g. chip delay, the derived versions of the communication signals can be phase shifted and/or amplitude scaled to further optimize the reliability of the signal transmitted from the base station 102 via the multiple antennas 208-212. As also stated above, the simplest form of delay diversity would involve simply transmitting the same signal from different antennas with at least one distinct delay between any two antennas such as depicted in FIG. 2.

Figure 7:
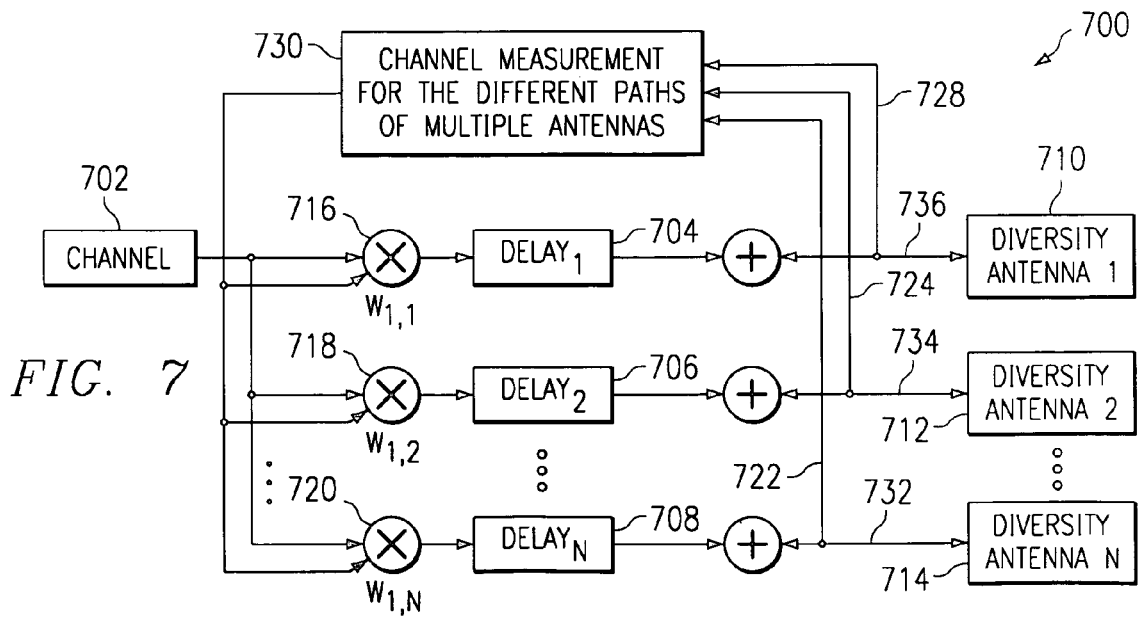
FIG. 7 is a simplified block diagram illustrating application of the present method to a well known TDMA communication system according to one embodiment of the present invention wherein transmission of different derived data signals is accommodated over a common channel by assigning each derived signal a unique time period.

Application of the present technique to a well known TDMA communication system is similarly shown in FIG. 7, wherein transmission of different derived data signals is accommodated over a common channel 702 by assigning each derived signal a unique time period (delay) 704, 706, 708. The same TDMA system signal is transmitted from multiple antennas 710, 712 714, with each antenna having a different time delay 704-708 for the same signal. Since the signals associated with the common channel 702 may be delayed at baseband, different delays 704-708 can be easily used for each TDMA system channel (e.g. channel 702).

Delay diversity within the TDMA system shown in FIG. 7 is similarly achieved in accordance with the present method by transmitting different derived versions of the same TDMA system signal from different antennas 710-714 with at least one distinct delay 704-708 between any two antennas. The derived versions of the signal are obtained by scaling the amplitude and/or phase shifting via multiplier/phase shifting elements 716-720 in a manner familiar to those skilled in the art of signal processing. Since use of delay parameters alone to accomplish transmit diversity may not be enough to accommodate reliable signal reception at a mobile terminal under certain unique situations, it is also advantageous to either phase shift the signals to be transmitted and/or scale the signal amplitude of the signals to be transmitted. These unique situations can be determined by taking channel measurements 730 for the different signal paths 722-728 associated with the multiple antennas 710-714. These channel measurements 730 will provide an indication of the signal phase and signal amplitude to be associated with a particular signal to be transmitted over each signal path 732-736. Thus, by feeding back the requisite TDMA system channel measurement data, e.g. symbol delay, the derived versions of the TDMA communication system signals can be phase shifted and/or amplitude scaled to further optimize the reliability of the signal transmitted from the base station 102 via the multiple antennas 710-714.

Figure 3:
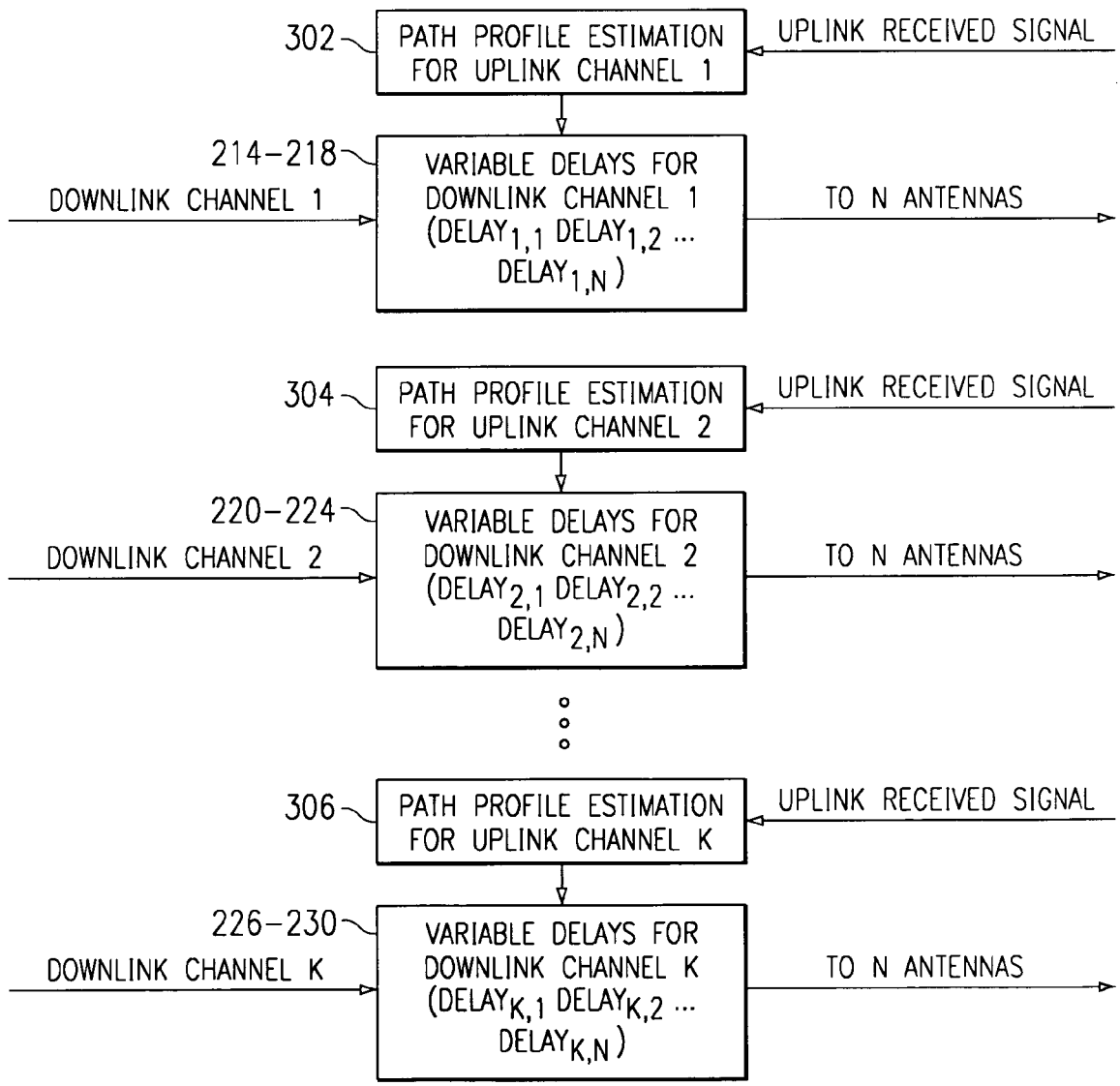
FIG. 3 is a block diagram illustrating a method of choosing channel delays associated with multiple antennas according to one embodiment of the present invention.

As seen in FIG. 3, the base station 102 can measure the delay profile 302, 304, 306 in the uplink transmission from a mobile terminal 104, 106, 108 to implement one method of choosing channel delays 214-230 associated with multiple antennas 208-212 according to one embodiment of the present invention. The delay 214-230 between the antennas 208-212 can be chosen so that the strongest signal paths between the base station 102 and the mobile terminals 104, 106, 108 do not overlap, thereby achieving full diversity. Thus, the present method is distinct from those presently known communication methods since it is adaptive in that the delay 214-230 is variable. The present method is also distinct from those presently known communication methods since it further strengthens the foregoing delay diversity by also implementing signal phase shifting and/or amplitude adjustment techniques to further optimize reception capabilities at the mobile terminals 104, 106, 108. The variable delay 214-230 need not remain fixed for a particular channel 202, 204, 206, but can be altered accordingly as necessary in order to meet the needs of a changing path profile between the base station 102 and one or more mobile terminals 104, 106, 108. There is of course, less flexibility in choosing the delays between antennas for broadcast channels transmitted to all mobile terminals since the same delay is used for all users. In this case, as stated herein before, the antenna delays 214-230 can be chosen so as to benefit the maximum number of users or the users at the edge of the cell.

Figure 4:
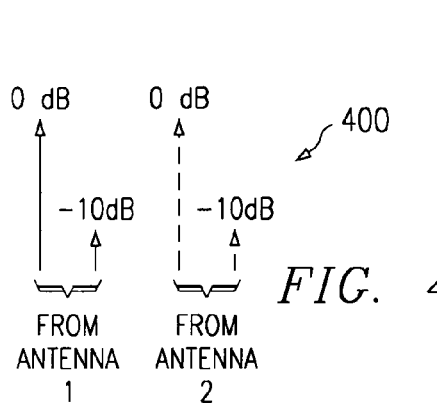
FIG. 4 is a diagram of a delay profile at a mobile terminal with a delay of 2 chips between two transmit antennas at the base station shown in FIG. 1 according to one embodiment of the present invention.

FIG. 4 is a diagram of a signal delay profile 400 at a mobile terminal 104, 106, 108 with a delay of 2 chips between two transmit antennas at the base station 102 shown in FIG. 1 according to one embodiment of the present invention. When the channel impulse response, for example, has two paths separated by 1-chip and having relative powers of 0 dB and −10 dB respectively, the foregoing 2-chip delay will provide the signal delay profile depicted in FIG. 4 at the mobile terminal. Since the paths from the two antennas do not overlap, there is a full 4-path diversity.

Figure 5:
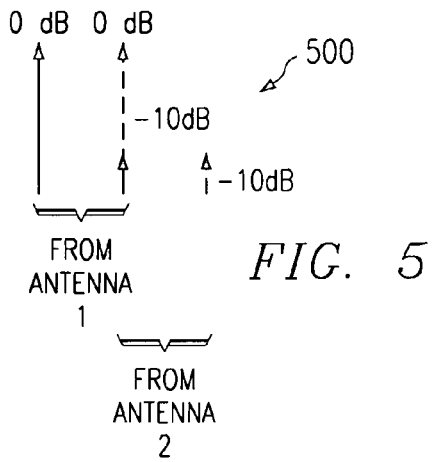
FIG. 5 is a diagram of a delay profile at a mobile terminal with a delay of 1 chip between two transmit antennas at the base station shown in FIG. 1 according to one embodiment of the present invention.

FIG. 5 is a diagram of a delay profile 500 at a mobile terminal with a delay of only 1-chip between two transmit antennas at the base station shown in FIG. 1 according to one embodiment of the present invention. When the above channel impulse response having two paths separated by 1-chip and further having relative powers of 0 dB and −10 dB respectively is transmitted with only a 1-chip delay, the signal delay profile 500 is seen by the mobile terminal. In this instance, the second path from antenna 1 overlaps with the first path from antenna 2, thereby resulting in less desirable 3-path diversity. The channel measurements 256 associated with signal delay, signal amplitude and signal phase parameters along signal paths 250-254 shown in FIG. 2 then are indicative of the instant conditions.

Figure 6:
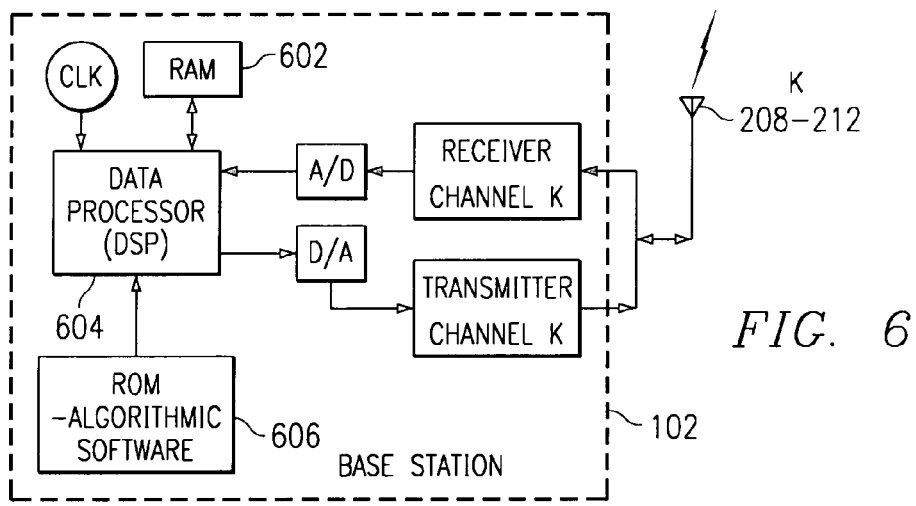
FIG. 6 is a simplified block diagram illustrating a base station configured to implement combined signal parameter diversity according to one embodiment of the present invention.

As shown in FIG. 6, discrete data associated with these channel measurements 256 is stored in a data storage unit 602 within the base station 102 so that it can be supplied to a data processor 604 such as a digital signal processor (DSP). The data processor (DSP) 604 is directed by an algorithmic software 606, also stored within the base station 102, such that is can automatically derive signal parameters using algorithmically defined relationships associated with discrete channel measurement data. These derived signal parameters are then used to characterize each derived signal communicated between the base station 102 and each respective antenna 208-212. With continued reference to FIG. 5, the present technique will then ensure the overlapping signal paths will inherit constructive rather than destructive signal transmission characteristics. The overlapping signals from Antenna 1 and Antenna 2, for example, will be synchronized such that their respective phase relationships will operate constructively to enhance the signal amplitude along the overlapping signal path. The mobile terminal 104-108 will see a stronger and more reliable signal using the present technique as contrasted with a weaker and marginally acceptable signal when simply using delay diversity alone to distinguish overlapping communication signals. As described in U.S. patent application entitled System And Method Of Communication Using Transmit Antenna Diversity Based Upon Uplink Measurements For The TDD Mode Of WCDMA, Ser. No. 09/523, 329, filed on Mar. 10, 2000, by Timothy M. Schmidl and Anand G. Dabak, the total impulse response of each channel 202-206, including the delay spread of the transmit antennas 208-212, must be kept less than the length of the channel estimation window associated with the base station 102 such that signals received by a mobile terminal 104-108 via one antenna will not overlap signals received by a mobile terminal via a different antenna. The foregoing delay spread is most preferably limited to M=16 chips or less as shown by equation (1) below.

$$|Delay_{k,i} - Delay_{k,j}| \leq M \text{ chips}; \ i \in [1, 2, \ldots, N]; \ j \in [1, 2, \ldots, N] \quad (1)$$

This invention has been described in considerable detail in order to provide those skilled in the wireless communication art with the information need to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, the present combined parameter diversity technique is useful in providing enhanced communication for any number of communication modes and is not limited in application to either TDMA or CDMA communication modes. Further, the exemplary combined signal parameter diversity of the present invention can be implemented in hardware or software, or a combination of both. In a preferred embodiment, the functions of a data communication system designed in conformance with the principals set forth herein are implemented as one or more integrated circuits using a suitable processing technology, e.g., CMOS, HBT.

As another example, at least portions of the present invention may be implemented in computer programs, i.e. algorithms, executing on programmable computers each comprising a data processor, a data storage system, including both volatile and non-volatile memory and/or data storage devices, at least one input device, and at least one output device. Program code is applied to input data to perform the functions described herein and generate output information. The output information is applied to one or more output devices, in known fashion. Each such program may be implemented in a high level procedural or object oriented programming language to communicate with a computer system. However, the programs can be implemented in assembly or machine language, if desired. In any case, the language may be a compiled or interpreted language. Portions of the inventive structure and method may also be considered to be implemented as a computer-readable storage medium, configured with a computer program, where the storage medium so configured causes a data processor to operate in a specific and predefined manner to perform the functions described herein. An example of one such type of data processor is a digital signal processor (DSP).

What is claimed is:

1. A method of communicating data between a transmitter having a plurality of antennas and at least one remote receiver, the method comprising the steps of:

phase shifting a plurality of data communication signals from a respective plurality of channels to generate derived versions of each data communication signal, each derived version of each data communication signal having a respective signal phase shift;

transmitting the derived versions of each data communication signal to respective antennas within the plurality of antennas;

providing a distinct delay associated with each derived version of each data communication signal and its respective antenna; and altering the distinct delay associated with a derived version of a data communication signal in response to a change of an estimated delay profile of a delay between multipath signals associated with a channel of the plurality of channels.

2. The method according to claim 1 further comprising the step of receiving at the transmitter, data communication uplink signals from each remote receiver in communication with the transmitter and estimating a delay profile associated with each received uplink signal.

3. The method according to claim 2 further comprising the step of determining a distinct communication signal delay associated with each channel of the plurality of channels, wherein each communication signal delay is derived from data associated with the respective uplink signal.

4. The method according to claim 1 further comprising the step of amplitude scaling the plurality of data communication signals such that each derived version of each data communication signal will further have a respective signal amplitude.

5. The method according to claim 1 wherein the derived versions of a data communication signal transmitted to each antenna are associated with a code division multiple access (CDMA) data signal.

6. The method according to claim 1 wherein the derived versions of a data communication signal transmitted to each antenna are associated with a time division multiple access (TDMA) data signal.

7. A method for communicating data between a transmitter having a plurality of antennas and at least one remote receiver, the method comprising the steps of:

receiving at the transmitter, data communication uplink signals from each remote receiver in communication with the transmitter and estimating a delay profile of a delay between multipath signals associated with each received uplink signal;

determining a distinct communication signal delay associated with each communication channel within a plurality of communication channels, wherein each communication channel signal delay is derived from the estimated delay profile of data associated with the respective uplink signal;

transmitting from the transmitter, a communication signal via each communication channel to each antenna within the plurality of antennas;

providing a distinct delay associated with each communication channel and its respective antenna;

measuring channel information between the transmitter and the plurality of antennas, the channel information selected from the group consisting of signal amplitude, signal phase and signal delay;

determining a desired communication signal phase shift associated with each communication channel from the measured channel information; and selectively phase shifting communication signals produced at the transmitter to generate derived versions of channel communication signals, each derived version of the channel communication signals having its desired communication signal phase shift.

8. The method according to claim 7 further comprising the step of altering the distinct delay associated with a channel communication signal and its respective antenna if and when the estimated delay profile associated with the specific channel communication signal changes from a prior estimated delay profile.

9. The method according to claim 7 wherein the step of receiving at the transmitter, a communication uplink signal from each remote receiver in communication with the transmitter and estimating a delay profile associated with each received uplink signal comprises the step of receiving a time division multiple access (TDMA) data signal.

10. The method according to claim 7 wherein the step of receiving at the transmitter, a communication uplink signal from each remote receiver in communication with the transmitter and estimating a delay profile associated with each received uplink signal comprises the step of receiving a code division multiple access (CDMA) data signal.

11. A communication system comprising:

a transmitter having a plurality of spaced apart antennas;

a channel measurement circuit coupled to the plurality of spaced apart antennas and arranged to produce a delay profile estimate of a delay between multipath signals from a remote transmitter;

a channel input terminal coupled to receive a data communication signal; and a delay circuit operatively coupled between the channel input terminal and the plurality of spaced apart antennas providing a distinct delay in the data communication signal in response to the delay profile estimate.

12. The communication system according to claim 11 wherein the data communication signal is associated with a code division multiple access (CDMA) data signal.

13. The communication system according to claim 11 wherein the data communication signal is associated with a time division multiple access (TDMA) data signal.

14. The communication system according to claim 11 wherein the channel measurement circuit is configured to phase shift the data communication signal.

15. The communication system according to claim 14 wherein the channel measurement circuit is further configured to amplitude scale the data communication signal.

16. The communication system according to claim 11 wherein the channel measurement circuit is configured to amplitude scale the data communication signal.

17. A data communication system comprising:

a transmitter having a plurality of spaced apart antennas suitable for communication with at least one remote transceiver;

an element providing a derived version of each communication signal transmitted from a transmitter channel to the plurality of spaced apart antennas; and a delay element providing a distinct delay associated with each antenna and configured to alter the distinct delay in response to a change of a delay between multipath signals from the at least one remote transceiver.

18. The data communication system according to claim 17 wherein the delay element provides the distinct delay to a code division multiple access (CDMA) communication signal.

19. The data communication system according to claim 17 wherein the delay element provides the distinct delay to a time division multiple access (TDMA) communication signal coupled between the transmitter and the plurality of spaced apart antennas can be demodulated within the at least one remote transceiver.

20. The data communication system according to claim 17 wherein the element providing a derived version of each communication signal is configured to phase shift a communication signal transmitted from a transmitter channel to the plurality of spaced apart antennas.

21. The data communication system according to claim 17 wherein the element providing a derived version of each communication signal is further configured to amplitude scale a communication signal transmitted from a transmitter channel to the plurality of spaced apart antennas.

22. A data communication system comprising:
a transmitter configured to communicate with at least one remote receiver, the transmitter having a plurality of spaced apart antennas and further having:
a data processor;
a data input device in communication with the data processor;
an algorithmic software directing the data processor; and
a data storage unit, wherein discrete channel measurement data and discrete communication signal uplink data associated with at least one remote receiver in communication with the transmitter is stored and supplied to the data processor such that the data processor, directed by the algorithmic software, can automatically derive communication signal parameters using algorithmically defined relationships associated with the discrete channel measurement data such that derived communication signals communicated between the transmitter and each respective antenna will be characterized by at least one distinct signal parameter selected from the group consisting of signal phase and signal amplitude; and further wherein the data processor is further directed by the algorithmic software such that it can automatically determine signal delay profile parameters of a delay between multipath signals using algorithmically defined relationships associated with discrete communication signal uplink data such that a signal communicated between the transmitter and each antenna will be characterized by a distinct signal delay.

23. The data communication system according to claim 22 further comprising at least one remote receiver.

24. The data communication system according to claim 23 wherein the at least one remote receiver is configured to demodulate a time division multiple access (TDMA) signal generated by the transmitter.

25. The data communication system according to claim 23 wherein the at least one remote receiver is configured to demodulate a code division multiple access (CDMA) signal generated by the transmitter.

26. A communication system in which system users communicate information signals through a transmitter, the transmitter having an antenna system comprising:
a plurality of spaced apart antennas;
signal distributing means for coupling communication signals between a transmitter and the plurality of spaced apart antennas;
signal deriving means operatively coupled to the signal distributing means for providing communication signal phase parameters associated with communication signals, wherein the phase parameters are determined from channel measurement information associated with the signal distributing means; and
variable delaying means operatively coupled to the plurality of spaced apart antennas and the signal distribution means for providing discrete delays associated with delay profile estimates of a delay between multipath signals of the communication signals and the plurality of spaced apart antennas.

27. The communication system according to claim 26 wherein the variable delaying means comprises:
a data processor;
an algorithmic software directing the data processor; and
a data storage unit, wherein discrete signal uplink data associated with at least one mobile terminal in communication with the transmitter is stored and supplied to the data processor such that the data processor, directed by the algorithmic software, can automatically determine signal delay profile parameters using algorithmically defined relationships associated with the discrete signal uplink data such that a signal communicated between the transmitter and each antenna will be characterized by a signal delay distinct to each antenna.

28. The communication system according to claim 27 wherein the algorithmic software is configured to further direct the data processor such that the data processor can determine new signal delay profile parameters to re-characterize the signal delay distinct to each antenna when the discrete signal uplink data received by the transmitter are sufficiently changed to require that a distinct signal delay change by at least one chip from an existing distinct signal delay.

29. The communication system according to claim 26 wherein the communication signals are associated with code division multiple access (CDMA) data.

30. The communication system according to claim 26 wherein the communication signals are associated with time division multiple access (TDMA) data.

31. A method of communicating data between a transmitter having a plurality of antennas and at least one remote receiver, the method comprising the steps of:
selectively amplitude scaling data communication signals produced at the transmitter to generate derived versions of the data communication signals, each derived version of the data communication signals having a respective signal amplitude;
transmitting from the transmitter, derived versions of each data communication signal to each antenna within the plurality of antennas;
providing a distinct delay associated with each derived version of the data communication signal and its respective antenna; and
altering the distinct delay associated with a derived version of the data communication signal and its respective antenna if and when an estimated delay profile of a delay between multipath signals associated with a communication channel changes from a prior estimated path profile.

32. The method according to claim 31 further comprising the step of selectively phase shifting data communication signals produced at the transmitter such that each derived version of the data communication signals will further have a respective signal phase shift.

33. The method according to claim 31 wherein the derived versions of a data communication signal transmitted to each antenna are associated with a code division multiple access (CDMA) data signal.

34. The method according to claim 31 wherein the derived versions of a data communication signal transmitted to each antenna are associated with a time division multiple access (TDMA) data signal.

35. A data communication system comprising:
a transmitter having a plurality of spaced apart antennas suitable for communication with at least one remote receiver;
a phase shifting element providing a derived version of a communication signal transmitted from a transmitter channel to the plurality of spaced apart antennas, wherein the phase shifting element is configured to phase shift the communication signal; and
a delay element providing a distinct delay associated with each antenna in response to a delay profile estimate of a delay between multipath signals from the at least one remote receiver.

36. The data communication system according to claim 35 wherein the delay element provides the distinct delay to a code division multiple access (CDMA) communication signal.

37. The data communication system according to claim 35 wherein the delay element provides the distinct delay to a time division multiple access (TDMA) communication signal.

38. A data communication system comprising:
- a transmitter having a plurality of spaced apart antennas suitable for communication with at least one remote receiver;
- a multiplier element providing a derived version of a communication signal transmitted from a transmitter channel to the plurality of spaced apart antennas, wherein the multiplier element is configured to amplitude scale the communication signal; and
- a delay element providing a distinct delay associated with each antenna in response to a delay profile estimate of a delay between multipath signals from the at least one remote receiver.

39. The data communication system according to claim 38 wherein the delay element provides the distinct delay to a code division multiple access (CDMA) communication signal.

40. The data communication system according to claim 38 wherein the delay element provides the distinct delay to a time division multiple access (TDMA) communication signal.

* * * * *